F. T. SHRAKE.
Middlings Feeder for Millstones.

No. 206,047.          Patented July 16, 1878.

WITNESSES          INVENTOR
Saml. R. Turner          Frederick T. Shrake
C. M. Sites      By      R. S. & A. P. Lacey
                                       Attorneys

UNITED STATES PATENT OFFICE.

FREDERICK T. SHRAKE, OF NEW PHILADELPHIA, OHIO, ASSIGNOR OF ONE-HALF HIS RIGHT TO A. BEYER, OF SAME PLACE.

IMPROVEMENT IN MIDDLINGS-FEEDERS FOR MILLSTONES.

Specification forming part of Letters Patent No. 206,047, dated July 16, 1878; application filed May 21, 1878.

*To all whom it may concern:*

Be it known that I, FREDERICK T. SHRAKE, of New Philadelphia, in the county of Tuscarawas and State of Ohio, have invented certain new and useful Improvements in Middlings-Feeders for Mill-Burrs; and I do hereby declare that the following is a full, clear, and exact description thereof, which will enable others skilled in the art to which it pertains to make and use the same, reference being had to the accompanying drawing, and to the letters of reference marked thereon, which form a part of this specification.

This invention consists in an adjustable valve hinged to the inner side of the feed-box and extended downward, having its lower end curved under the feed-roller, together with its operating mechanism, all of which will be hereinafter fully explained.

Figure 1:
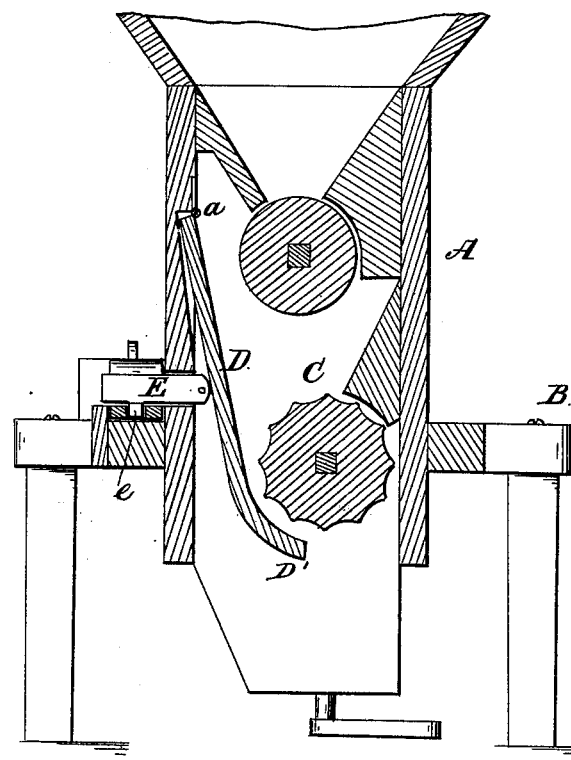
Figure 2:
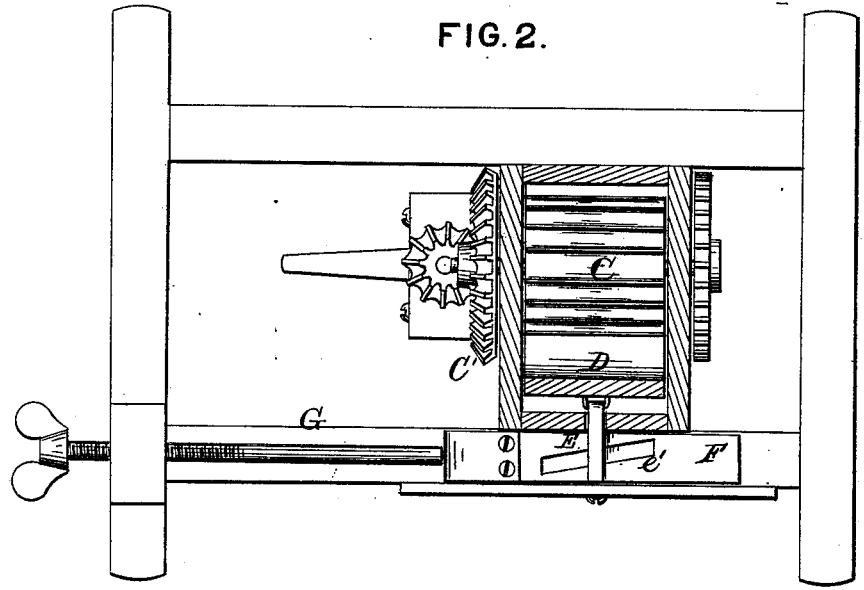

In the drawings, Figure 1 is a vertical longitudinal section, and Fig. 2 is a horizontal cross-section, of a middlings-feeder with my improvement applied thereto.

A is the hopper or feed-box, within which are supported the feed-rollers; and B is the trestle or frame which supports the feed-box. C is a corrugated feed-roller placed in the lower end of the feed-box, and is provided with an outer gear-wheel, C', which is driven by other suitable connecting gear mechanism. D is a valve hinged at *a*, which swings freely to the inner side of the feed-box A and above the roller C, and extending vertically downward past the side of roller C, and having its lower end D' curved and arranged to move below and under the roller C. E is an arm pivoted to the back of the valve D, and extends through to the outer side of the feed-box, and has a small pin or projection, *e*, which enters a cam-slot, *e'*, in a sliding bar, F. The sliding bar F is held in place by suitable guides affixed on the frame B, and is operated by a swiveled rod, G, having its bearings in the end of the said bar and on the said frame B.

By turning the rod G the bar F is moved and the cam-slot *e'* acts on the pin *e* and arm E, and thus the valve is set out or in, as desired.

The curved lower end D' of the valve regulates the flow of the grain or middlings, and gives a more even feed than is done by valves of ordinary construction.

Having described my invention, what I claim, and desire to secure by Letters Patent, is—

The adjustable valve D, hinged to the inner side of the feed-box A, and extending vertically downward, with its lower end curved below the roller C, in combination with the arm E and sliding bar F, pivoted to the outer side of the feed-box A, and operated by the turning-rod G, substantially as and for the purposes set forth.

In testimony that I claim the foregoing as my own I affix my signature in presence of two witnesses.

FREDERICK T. SHRAKE.

Witnesses:
H. A. MACKAMAN,
ASBURY INSLEY.